3,560,490
Patented Feb. 2, 1971

1

3,560,490
TRIFLUOROMETHYL FURAN DERIVATIVES
Kenneth K. Wyckoff, David M. Tennent, and Ronald E. Bambury, Ashland, Ohio, assignors to Richardson-Merrell Inc., New York, N.Y.
No Drawing. Continuation-in-part of applications Ser. No. 482,907, Aug. 26, 1965, now Patent No. 3,405,163, Ser. No. 493,534, Oct. 6, 1965, now Patent No. 3,442,913, and Ser. No. 493,535, Oct. 6. 1965, now Patent No. 3,439,000. This application Feb. 28, 1966, Ser. No. 530,316
Int. Cl. C07d 5/26
U.S. Cl. 260—240
20 Claims

ABSTRACT OF THE DISCLOSURE

Novel hydrazone and oxime derivatives of 5-trifluoromethylfurans. The hydrazone or oxime group can be in either the 2- or 3-position of the furan ring. The 2- or 3-position which does not contain a hydrazone or oxime can be substituted with phenyl or naphthyl. The 4-position of the furan ring can be substituted with an ester group of the formula $$-\overset{O}{\underset{\|}{C}}-O-R$$

wherein R is (lower) alkyl, cycloakyl of 3 to 6 carbon atoms, phenyl, naphthyl, benzyl, phenethyl, α-naphthylmethyl or β-naphthylmethyl. The novel hydrazones and oximes of this invention can be used as growth promoting agents and as coccidiostatic agents for veterinary animals.

This application is a continuation-in-part of our copending applications Ser. No. 482,907, filed on Aug. 26, 1965, now U.S. Pat. No. 3,405,163, issued Oct. 8, 1968; Ser. No. 493,534 filed Oct. 6, 1965 now U.S. Pat. No. 3,442,913, issued May 6, 1969; and Ser. No. 493,535, filed on Oct. 6, 1965, now U.S. Pat. No. 3,439,000, issued Oct. 8, 1968.

This invention relates to novel trifluoromethylfuran compounds. More particularly, this invention relates to novel hydrazone and oxime derivatives of trifluoromethylfurans.

The term "hydrazone" as employed herein refers to groups of the formula.

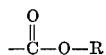

wherein each of A and A¹ can be hydrogen or an organic substituent of a hydrazine or hydrazide or A and A¹ represent a heterocyclic group having the nitrogen to which they are attached as a hetero atom. Such hydrazone groups can have from 0 to about 14 carbon atoms, from 2 to about 20 hydrogen atoms, from 2 to 5 nitrogen atoms, from 0 to 4 oxygen atoms, from 0 to 3 sulfur atoms and from 0 to 4 halogen atoms, e.g., chlorine or bromine. Thus the structure of the hydrazone group can be that of a hydrazine, or hydrazide including semi-carbazones, aminoguanidines and thiosemicarbazones. The term "oximes" as employed herein includes groups of the formula

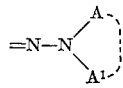

wherein L is hydrogen or O-sulfonic acid and R¹ is hydrogen, (lower) alkyl, (lower) phenylalkyl, or phenyl, Preferably A² and R¹ of the oximes and A¹ of the hydrazone groups is hydrogen.

2

Novel hydrazone compounds of this invention include trifluoromethylfuran esters which can be represented by the formula

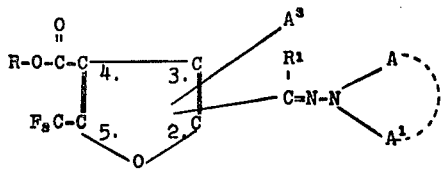

Formula I wherein: the methylidene hydrazone group

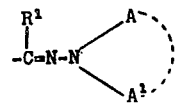

is attached to either the 2- or 3-carbon atom of the furan ring; and A³ can be hydrogen or a carbocyclic aryl having from 6 to 10 carbon atoms; i.e., phenyl or naphthyl attached to the remaining 2- or 3-carbon atom of the furan ring; R is (lower) alkyl, cycloalkyl having from 3 to 6 carbon atoms, carbocyclic aryl having from 6 to 10 carbon atoms of carbocyclic arylalkyl having from 7 to 14 carbon atoms, e.g., benzyl, phenylethyl, α-naphthylmethyl, β-naphthylethyl, and the like; R¹ is hydrogen, phenyl, or (lower) alkyl and

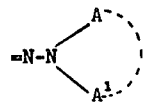

represents a hydrazone group. Preferably, in the above Formula I compounds, R is (lower) alkyl, R¹ is hydrogen, A¹ is hydrogen and A is an organic substituent of a hydrazine or hydrazide, i.e., the group

is a secondary amino group. Illustrative of hydrazone groups wherein A and A¹ are not joined to form a heterocyclic, there can be mentioned those wherein each of A and A¹ can be hydrogen, (lower) alkyl, (lower) hydroxyalkyl, cycloalkyl having from 3 to 6 carbon atoms, phenyl, (lower) phenylalkyl, halo-substituted phenyl, e.g., having from 1 to 4 halogen atoms, such as chlorine or bromine, nitro-substituted phenyl, e.g., having 1 or 2 nitro groups, monocyclic heterocyclics having from 1 to 3 hetero atoms, i.s., oxygen, sulfur or nitrogen, and 2 to 5 carbon atoms, and bicyclic heterocyclics having from 1 to 3 hetero atoms and from 5 to 10 carbon atoms. Illustrative of heterocyclics wherein A and A¹ together with the nitrogen to which they are attached form a heterocyclic, there can be mentioned various monocyclic heterocyclics having from 1 to 3 hetero atoms and 2 to 5 carbon atoms, and bicyclic heterocyclics having from 5 to 10 carbon atoms and from 1 to 3 hetero atoms. Additionally, in another embodiment of this invention, particularly when A¹ is hydrogen, A can be a group of the formula

wherein X is oxygen, sulfur, imino, (lower) alkylimino, phenylimino or (lower) phenalkylimino, and D is—NH₂, (lower) alkylamino, (lower) dialkylamino, phenylamino, diphenylamino, (lower) di(phenylalkyl)amino, (lower)

phenylalkylamino, (lower) alkyl, phenyl, nitro-substituted phenyl, e.g., having 1 or 2 nitro groups, (lower) phenylalkyl, and the like.

Illustrative of (lower) alkyls, i.e., alkyls having from 1 to 5 carbon atoms, which can be employed for the various substituents of the Formula I compounds, there can be mentioned: methyl, ethyl, propyl, isopropyl, n-butyl, tertiary butyl, n-pentyl and the like. The (lower) alkyls employed preferably have from 1 to 3 carbon atoms. Illustrative of (lower) hydroxyalkyls, i.e., hydroxyalkyls, e.g., alkylols, having from 1 to 5 carbon atoms, there can be mentioned: 2-hydroxyethyl, 3-hydroxypropyl, 4-hydroxybutyl, 5-hydroxypentyl, and the like. Illustrative of the various heterocyclic groups which can be employed for the various substituents of the Formula I compounds, there can be mentioned: hydantoins, 3-(2-oxazolidinones), piperidino, 4-(lower) alkyl piperazino, 2-benzothiazolyl, 2-quinolinyl, 3-quinolinyl, pyrrolidino, morpholino, thio-morpholino, 2 - (1,2,3,4-tetrahydroisoquinolyl), 1-(1,3,4-triazolyl), 3-(1,3,4-oxadiazolyls), 3-(2-thiooxazolidonyl), symmetrical triazinyl, and the like.

The preferred position of the methylidene hydrazone group is on the 2-carbon atom, in which event it is preferred that the 3-carbon atom carry a hydrogen atom, i.e., $A^3$ is hydrogen, as can be represented by the formula

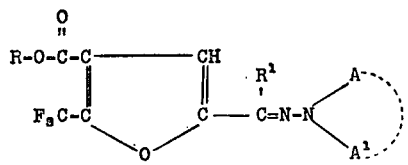

wherein R, $R^1$, A and $A^1$ have the meanings given hereinbefore.

Novel hydrazone compounds of this invention also include trifluoromethylfurans which can be represented by the formula

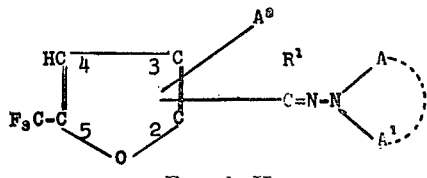

Formula II wherein $A^3$, $R^1$, A and $A^1$ have the same meaning, including various preferred groups and positions as in the Formula I compounds. Thus, it can be seen that the trifluoromethylfurans of the above Formula II are structurally identical to those of Formula I except that the 4-carbon atom of the furan ring in the Formula II compounds carries a hydrogen atom, instead of an ester group.

The novel oximes of this invention can be represented by the formulae:

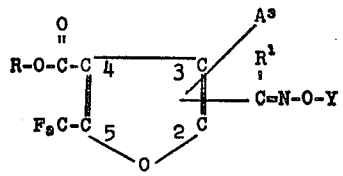 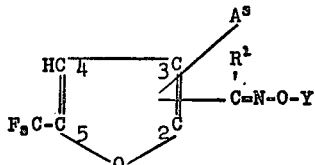

Formula III    Formula IV wherein R, $R^1$, and $A^3$ have the same meaning, including preferred groups, as that of the Formula I compounds, and the

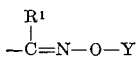

group is in the 2- or 3-position of the furan ring whereas the remaining 2- or 3-position carries the $A^3$ group, and Y is hydrogen or O-sulfonic acid. As in the case of the Formula I and II compounds, $A^3$ of Formulas III and IV is preferably in the 3-position of the furan ring, in which event the oxime group is in the 2-position.

The novel oximes and hydrazones, or broadly novel compounds of this invention, also embrace the acid addition salts and the quaternary salts of the novel oximes and hydrazones of the free base form. The quaternary salts and acid addition salts can be prepared by conventional techniques. Illustrative of suitable acids for preparing the acid addition salts, there can be mentioned hydrochloric, tartaric, maleic, phosphoric, citric and furic acids.

In a preferred method, the novel hydrazone and oxime compounds of this invention are prepared by the well-known reaction of condensing equal molar quantities of the corresponding aldehyde or ketone of a Formula I to IV compound, i.e., wherein the

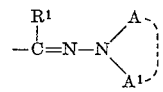

group of the Formula I and II compounds or the oxime group of the Formula III and IV compounds is formyl, alkylcarbonyl of 2 to 6 carbon atoms or phenylalkylcarbonyl having from 1 to 6 carbon atoms in the alkyl group with a hydrazine, hydrazide or oxyamine. The hydrazine and hydrazide reactants can be represented by the formula

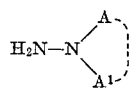

wherein A and $A^1$ have the meaning given hereinbefore. The oxyamine reactants for preparing the oximes can be represented by the formula

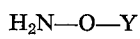

wherein Y is hydrogen or O-sulfonic acid. Illustrative of hydrazine, hydrazide, hydroxide or oxyamine reactants for preparing the hydrazones and oximes of this invention, there can be mentioned: aminoguanidine; 1-amino-3-nitroguanidine; 1-benzyl-1-phenylhydrazine; p-bromophenylhydrazine; carbohydrazide; 1,1-dimethylhydrazine; 2,4-dinitrophenylhydrazine; 1,1-diphenylhydrazine; 4,4-diphenylsemicarbazide; formylhydrazine; benzhydrazide; 2-hydrazinobenzothiazole; 2-hydrazinoquinoline; 3-hydrazinoquinoline; hydroxylamine; hydroxylamine-O-sulfonic acid; isonicotinic acid hydrazide; 1-methyl-1-phenylhydrazine; 1-naphthylhydrazine; m-nitrobenzhydrazide; p-nitrobenzhydrazide; p-nitrophenylhydrazine; oxalyl dihydrazide; 4-(p-phenylazophenyl)semicarbazide; phenylhydrazine; p-hydrazinobenzenesulfonic acid; 4-phenylsemicarbazide; 4 - phenyl - 3 - thiosemicarbazide; salicylhydrazide; semicarbazide; thiocarbohydrazide; thiosemicarbazide; 2, 4,6-trichlorophenylhydrazine; 1,1,1-trimethylhydrazonium iodide; 1-acetylthiosemicarbazide; allophanic acid hydrazide; 4 - allylthiosemicarbazide; 1 - amino-4-($\beta$-hydroxyethyl)piperazine; N-amino-3-hydroxypiperidine; 1-amino-4-methylpiperazine; N-aminomorpholine; N-aminopiperidine; N-aminopyrrolidine; N-aminorhodanine; N-amino-1,2,3,4 - tetrahydroisoquinoline; 4-amino-1,2,3,4 - triazole; benzilic hydrazide, benzoylhydrazine; benzylhydrazine; 1-benzyl - 4 - hydrazinopiperidine; 4-chlorophenylhydrazine; 2-chlorophenylhydrazino-4-sulfonic acid; 2-chlorophenylhydrazine-5-sulfonic acid, cyanoacetohydrazide; 4-cyclohexylthiosemicarbazide; cyclopropanecarboxylic hydrazine; 1,4-dihydrazinophthalazine; 5,6-dimethylbenzimidazole-1-acethydrazide; 3,5-dinitrobenzhydrazide; ethyl hydrazinoacetate; 4-fluorophenylhydrazine; 2-hydrazino-4-hydroxy-6-methylpyrimidine; β-hydroxyethylhydrazine; 2-hydroxy-3-naphthoic acid hydrazide; indole-3-acetic acid hydrazide; β-(3-indole)propionic acid hydrazide, o-methoxyphenylhydrazine; 4-methylthiosemicarbazide; 1-naphthylacethydrazide; 2-nitrophenylhydrazine; 3-nitrophenylhydrazine; oxamic hydrazide; phenylacethydrazide; β-phenylethylhydrazine; pimelic dihydrazide; N-pyridiniumacet-hydrazide chloride; stearic hydrazide; succinic hydrazide; syringic hydrazide; thiocarbohydrazide; p-thiocyanophenylhydrazine; 4-toluichydrazide; and 3,4,5-trimethoxybenzhydrazide. The reaction for the preparation of the hydrazones and oximes of this invention can be illustrated by the following equations in the preparation of hydrazones:

or bromine, on the carbon atom of the alkyl or phenylalkyl adjacent to the furan aromatic ring. Methods for the preparation of aldehydes and ketones of Formula V are set forth in our copending U.S. patent application Ser. No. 493,535, filed on Oct. 6, 1965. The following equation shows one method for the preparation of the aldehyde and ketone intermediates of Formula V by alkaline hydrolysis:

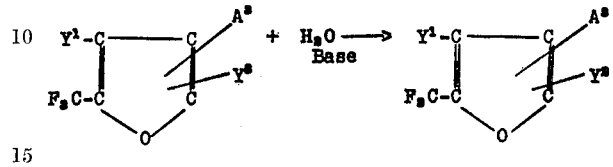

Formula VI                Formula V

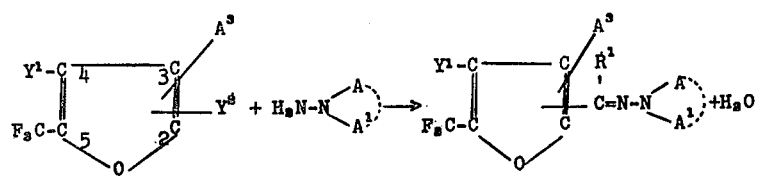

wherein $Y^1$ is hydrogen or an ester group as represented by

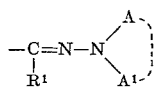

in the Formula I compounds; A, $A^1$, $A^3$ and $R^1$ have the same meaning as in the Formula I compounds; $Y^2$ is formyl, (lower) alkylcarbonyl or (lower) phenylalkylcarbonyl; and wherein $Y^2$ and the resulting

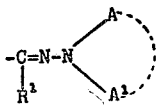

group is in the 2- or 3-position of the furan ring, and $A^3$ is in the remaining 2- or 3-position of the furan ring. In carrying out the reaction, for either the hydrazones or oximes, a solvent inert to the reactants is advantageously employed as the reaction medium. When the reactants are susceptible to hydroxylic solvents, non-polar vehicles such as benzene, dioxane, chloroform and the like are preferable. When the reactants are inert to hydroxylic solvents, the alcohols such as methanol, ethanol and isopropanol, and water or mixtures thereof can be employed. To insure completeness and to speed up the reaction, heat may be applied to the reaction mixture.

The aldehyde and ketone intermediates (Formula V compounds) can be prepared by conventional techniques for the preparation of aldehydes and ketones from aromatic compounds having an alkyl group of 1 to 6 carbon atoms or a phenylalkyl having 1 to 6 carbon atoms in the alkyl group and wherein the alkyl or phenylalkyl is substituted with one or two halogen atoms, e.g., chlorine wherein: $Y^1$, $A^3$ and $Y^2$ have the same meaning as in the Formula V compounds described hereinbefore; $Y^3$ is the group

wherein each $X^1$ is a halogen having an atomic number greater than 9 (i.e., chlorine, bromine or iodine) and G is hydrogen, alkyl of 1 to 5 carbon atoms or phenylalkyl having 1 to 5 carbon atoms in the alkyl group, and wherein $A^3$ is in either the 2- or 3-position of the furan ring and the $Y^3$ or resulting $Y^2$ group is in the remaining 2- or 3-position of the furan ring.

Methods for the preparation of the halogenated furans of Formula VI are described in our copending patent application Ser. No. 493,534, filed on Oct. 6, 1965. Briefly, in a preferred process, the compounds of Formula VI can be prepared by allylic halogenation by refluxing N-bromosuccinimide with a solution of carbon tetrachloride and the corresponding trifluoromethylfuran having a (lower) alkyl or (lower) phenylalkyl group in place of $Y^3$ in the Formula VI compounds. Optionally, an activator such as dibenzoyl peroxide is added to improve the bromination; also illumination of the refluxing mixture with an ultraviolet source speeds up the reaction. Equal molar quantities of the brominating agent and trifluoromethylfuran reactant are generally employed in preparing monobrominated derivatives, whereas two molar equivalents of the brominating agent are generally employed per mole equivalent of the trifluoromethylfuran reactant in preparing the dibrominated derivatives. This reaction can be depicted as follows for the preparation of dibrominated derivatives:

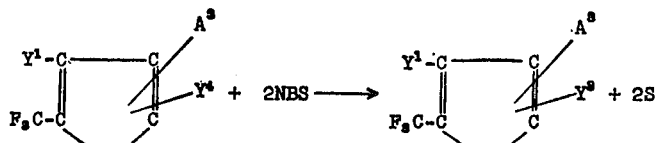

Formula VII                Formula VI wherein $Y^1$, $A^3$ and $Y^3$ have the same meaning as in Formula VI given hereinbefore. $Y^4$ is (lower) alkyl or (lower phenylalkyl, NBS is N-bromosuccinimide and S is succinimide.

The trifluoromethylfuran reactants of Formula VII for preparing the halogenated derivatives of Formula VI wherein the compounds have an ester group, i.e., $Y^1$ in Formula VII is an ester group, can be prepared by the cyclization, at a temperature of about 95° C., of a trifluoromethyl dione in contact with a catalytically effective quantity of an acid, e.g., sulfuric acid. This process together with resulting compounds is also described in our copending patent application Ser. No. 493,534, filed on Oct. 6, 1965. The process can be illustrated as follows:

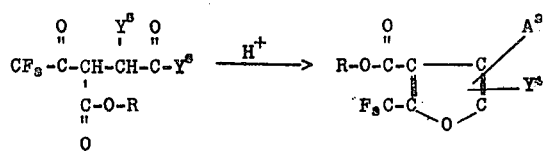

Formula VIII              Formula VII wherein: R has the same meaning as in the Formula I compounds; one of $Y^5$ and $Y^6$ is $A^3$, as described in the Formula I compounds; and the remaining $Y^5$ or $Y^6$ is $Y^4$ as described in the Formula VII compounds hereinbefore.

The preparation of the dione reactant of Formula VIII is described in our copending United States patent application Ser. No. 482,907, filed on Aug. 26, 1965. Briefly, the diones can be prepared by reacting an alkali metal enolate salt of certain trifluoroketo compounds with an α-haloketone in the presence of a catalytically effective quantity of an alkali metal iodide. The reaction can be illustrated as follows:

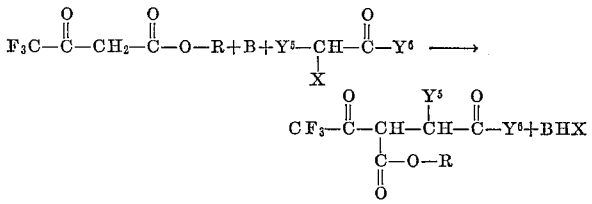

wherein: R has the same meaning as in the Formula I compounds and either $Y^5$ or $Y^6$ is hydrogen or carbocyclic aryl having from 6 to 10 carbon atoms whereas the remaining $Y^5$ or $Y^6$ is alkyl of 1 to 6 carbon atoms or phenylalkyl of 1 to 6 carbon atoms; X is a halogen such as bromide; and B is a strong alkali metal base, e.g., sodium ethoxide.

The trifluoromethylfurans of Formula VI wherein $Y^1$ is hydrogen which are used as reactants for the preparation of the aldehydes and ketones of Formula V wherein $Y^1$ is hydrogen are also derived from the esters of Formula VII. Thus the esters are first hydrolyzed to the corresponding acid. The hydrolysis is effected by preparing an alkali metal salt, e.g., with sodium hydroxide, of the ester of Formula VII and then converting the salt to the free furoic acid by contact with the mineral acid, e.g., hydrochloric acid. The acid is then thermally decarboxylated by heating at a temperature in the range of about 150° C. to 300° C., preferably in the presence of high boiling solvents such as quinoline together with a decarboxylation catalyst, e.g., copper oxide. The decarboxylated trifluoromethylfuran is then halogenated as described hereinbefore for the Formula VII compounds to produce the halogenated trifluoromethylfuran compounds of Formula VI.

The novel hydrazones and oximes of this invention can be used as growth promoting agents and as coccidiostatic agents for veterinary animals.

The hydrazones and oximes of this invention stimulate the growth of animals, e.g., poultry, and enhance feed efficiency through the administration of a small quantity of a novel hydrazone or oxime of this invention. For such use the novel oximes or hydrazones can be employed over a wide range of concentrations such as that of about 10 to 200 grams thereof per ton of animal feed. Illustratively, 4-carbethoxy-5-trifluoromethylfurfural oxime was mixed in feed at a concentration of 1 gram, 10 grams and 100 grams, respectively, per ton of animal feed and fed to seven day old broiler chickens for twenty-one days. The chicks showed an enhanced weight gain as compared to untreated controls.

The novel oximes and hydrazones of this invention are also useful in treating birds, e.g., chickens, infected with coccidiosis. For coccidiostatic use the novel compounds of this invention can be admixed with the feed or can be incorporated (particularly the acid addition salt form of the compounds) in the drinking water supply of the birds. For such use the novel compounds of this invention can be employed in quantities which can vary from about 0.05% to 1% by weight of the water or feed administered to the birds. Illustratively, 5-trifluoromethylfurfural semicarbazone, 4-carbethoxy-5-trifluoromethylfurfural oxime, 5 - trifluoromethylfurfural thiosemicarbazone and 3 - (5-trifluoromethylfurfurylideneamino) - 2-oxazolidone were effective in treating two week old white Leghorn cockerels infected with 70,000 sporulated ocysts of E. tenella. The compounds were administered to the birds at a concentration of about 0.1% in the feed on the same day that they were infected. The birds were given the medicated feed ad libitum throughout a continuous eight day trial.

The following examples are illustrative of the invention.

EXAMPLE 1

Preparation of 4-carbethoxy-5-trifluoromethyl-2-furfural thiosemicarbazone

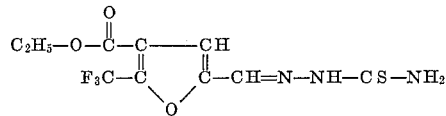

To a solution of 1.9 g. of thiosemicarbazide in 40 ml. of warm (50° C.) water was added 4.7 g. 4-carbethoxy-5-trifluoromethyl-2-furfural. The mixture was heated on the steam bath for a few minutes and shaken vigorously. The 4-carbethoxy-5-trifluoromethyl-2-furfural thiosemicarbazone precipitate which formed was collected by filtration. This material was recrystallized from benzene to give an analytical sample, M.P. 187–188° C.

Analysis.—Cal. for $C_{10}H_{10}F_3N_3O_3S$ (percent): C, 38.8; H, 3.26; F, 18.43; N, 13.6; S, 10.4. Found (percent): C, 38.9; H, 3.43; F, 19.00; N, 13.6; S, 10.4.

EXAMPLE 2

Preparation of 4-carbethoxy-5-trifluoromethyl-2-furfural oxime

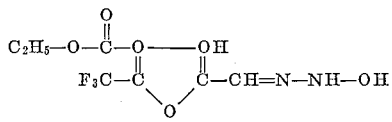

To a mixture of 11.5 g. of hydroxylamine hydrochloride, 18.6 g. sodium acetate and 55 ml. of water was added 25 g. 4-carbethoxy-5-trifluoromethyl-2-furfural and the mixture was shaken vigorously for 7 minutes. The 4-carbethoxy-5-trifluoromethyl-2-furfural oxime precipitate which formed was collected by filtration and dried. An 18.8 g. yield of oxime was obtained. Recrystallization of this oxime from petroleum ether gave an analytical sample, M.P. 99–102° C.

Analysis.—Cal. for $C_9H_8F_3NO_4$ (percent): C, 43.04; H, 3.12; N, 5.58; F, 22.69. Found (percent): C, 43.12; H, 3.22; N, 5.61; F, 22.60.

EXAMPLE 3

Preparation of 5-trifluoromethyl-2-furfural semicarbazone

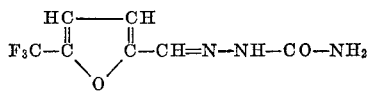

To a solution of 16 g. of semicarbazide hydrochloride and 24 g. of sodium acetate in 65 ml. of water was added 8.0 g. 5-(trifluoromethyl)-2-furfural. The mixture was shaken vigorously for 10 to 15 minutes and the white precipitate of 5-(trifluoromethyl)-2-furfural semicarbazone collected by filtration, wt. 12.0 (90% yield), M.P. 195–200° C. Recrystallization of this material from isopropyl alcohol and then from acetonitrile gave an analytical sample, M.P. 209–210° C.

*Analysis.*—Cal. for $C_7H_6F_3N_3O_2$ (percent): C, 38.0; H, 2.74; F, 25.8; N, 19.0. Found (percent): C, 38.0; H, 2.88; F, 25.7; N, 18.78.

EXAMPLE 4

Preparation of 5-trifluoromethyl-2-furfural thiosemicarbazone

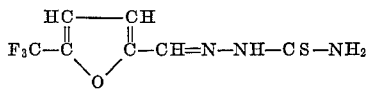

To 3.24 g. of thiosemicarbazide in 25 ml. boiling acetic acid was added 6.4 g. of 5-trifluoromethyl-2-furfural. The mixture was boiled 2 minutes, cooled and 30 ml. of water was added. The solid which precipitated was collected by filtration and dried under vacuum at 80° C. Recrystallization of the material from benzene gave 5-trifluoromethyl-2-furfural thiosemicarbazone, M.P. 162–164° C.

EXAMPLE 5

Preparation of N-(5-trifluoromethyl-2-furylideneamino)-2-oxazolidinone

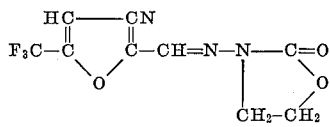

To a boiling mixture of 5.45 g. of 5-trifluoromethyl-2-furfural in 50 ml. of 30% aqueous acetic acid was added 3 g. of 3-amino-2-oxazolidinone. The mixture was boiled until all of the solid which had formed was dissolved. The solution was then cooled and the crystals which formed were collected by filtration, washed with water and dried. This procedure yielded 6.7 g. of N-(5-trifluoromethyl-2-furylidene amino)-2-oxazolidinone, M.P. 149–151° C.

EXAMPLE 6

Preparation of 5-trifluoromethyl-2-furfural oxime

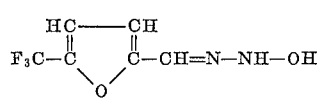

To a mixture of 4.2 g. hydroxylamine hydrochloride, 8.0 g. sodium acetate and 25 ml. of water was added 4.9 g. of 5-trifluoromethyl-2-furfural. The mixture was shaken vigorously and the precipitate which formed was collected by filtration. The material was recrystallized from a benzene and petroleum ether mixture to give 4.0 g. of 5-trifluoromethyl-2-furfural oxime, M.P. 118–119.5° C.

EXAMPLE 7

Preparation of 4-carbethoxy-5-trifluoromethyl-furfural semicarbazone

A mixture of 2.36 g. of 4-carbethoxy-5-trifluoromethyl-furfural (0.01 mole), 1.5 g. of semicarbazide hydrochloride, 1.5 g. of sodium acetate and 9 ml. of water was heated on the steam bath for a few minutes. Boiling alcohol was added until a clear solution was obtained. The mixture was cooled and poured into water, and the semicarbazone which precipitated was collected by filtration and dried, wt. 2.3 g., M.P. 181–188° C. Recrystallization of the material from alcohol gave an analytical sample, M.P. 199–201° C.

*Analysis.*—Cal. for $C_{10}H_{10}O_4N_3F_3$ (percent): C, 40.9; H, 3.44; N, 14.3; F, 19.4. Found (percent): C, 40.8; H, 3.28; N, 14.3; F, 19.5.

EXAMPLE 8

Preparation of 5-trifluoromethylfurfural p-bromophenylhydrazone

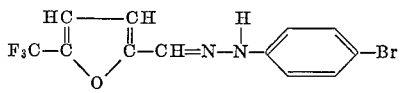

A solution of (a) 16.4 g. (0.1 mole) of 5-trifluoromethylfurfural in absolute alcohol is stirred during the dropwise addition of a solution of (b) 18.7 g. (0.1 mole) of p-bromophenylhydrazine in absolute ethyl alcohol. The stirred solution is heated to boiling and water is added until the solution just remains clear. After filtration the solution is chilled to give (c) 5-trifluoromethylfurfural p-bromophenylhydrazone.

EXAMPLE 9

Preparation of 4-carbethoxy-5-trifluoromethyl-2-furfural p-bromophenylhydrazone

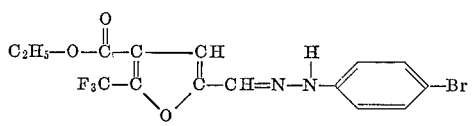

A solution of (a) 23.6 g. (0.1 mole) of 4-carbethoxy-5-trifluoromethyl-2-furfural in absolute alcohol is stirred during the dropwise addition of a solution of (b) 18.7 g. (0.1 mole) of p-bromophenylhydrazine in absolute ethyl alcohol. The stirred solution is heated to boiling and water is added until the solution just remains clear. After filtration the solution is chilled to give (c) 4-carbethoxy-5-trifluoromethyl-2-furfural p - bromophenylhydrazone.

EXAMPLE 10

Preparation of 5-trifluoromethyl-2-furfural 2,2-dimethylhydrazone

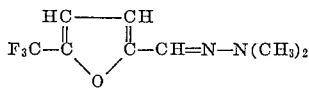

A solution of 16.4 g. (0.1 mole) of 5-trifluoromethyl-2-furfural in absolute ethyl alcohol is stirred during the dropwise addition of a solution of 6.0 g. (0.1 mole) of 1,1-dimethylhydrazine in absolute ethyl alcohol. The stirred solution is heated to boiling and water is added until the solution just remains clear. After filtration the solution is chilled to give 5-trifluoromethyl-2-furfural 2,2-dimethylhydrazone.

EXAMPLE 11

Preparation of 4-carbethoxy-5-trifluoromethyl-2-furfural 2,2-dimethylhydrazone

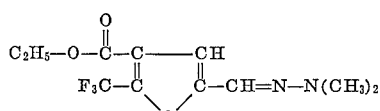

A solution of 23.6 g. (0.1 mole) of 4-carbethoxy-5-trifluoromethylfurfural in absolute ethyl alcohol is stirred during the dropwise addition of a solution of 6.0 g. (0.1 mole) of 1,1-dimethylhydrazine in absolute ethyl alcohol. The stirred solution is heated to boiling and water is added until the solution just remains clear. After filtration the solution is chilled to give 4-carbethoxy-5-trifluoromethyl-2-furfural 2,2-dimethylhydrazone.

EXAMPLE 12

Preparation of 5-trifluoromethyl-2-furfural 2,2-diphenylhydrazone

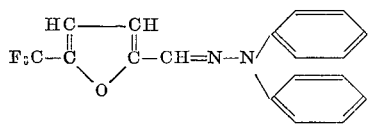

A solution of 16.4 g. (0.1 mole) of 5-trifluoromethyl-2-furfural in absolute ethyl alcohol is stirred during the dropwise addition of a solution of 18.4 g. (0.1 mole) of 1,1-diphenylhydrazine in absolute ethyl alcohol. The stirred solution is heated to boiling and water is added until the solution just remains clear. After filtration the solution is chilled to give 5-trifluoromethyl-2-furfural 2,2-diphenylhydrazone.

EXAMPLE 13

Preparation of 4-carbethoxy-5-trifluoromethyl-2-furfural 2,2-diphenylhydrazone

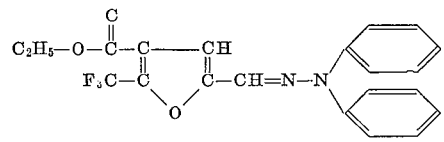

A solution of 23.6 g. (0.1 mole) of 4-carbethoxy-5-trifluoromethyl-2-furfural in absolute ethyl alcohol is stirred during the dropwise addition of a solution of 18.4 g. of 1,1-diphenylhydrazine in absolute ethyl alcohol. The stirred solution is heated to boiling and water is added until the solution just remains clear. After filtration the solution is chilled to give 4-carbethoxy-5-trifluoromethyl-2-furfural 2,2-diphenylhydrazone.

EXAMPLE 14

Preparation of methyl 5-trifluoromethylfurfurylketone p-nitrophenylhydrazone

A solution of 17.8 g. (0.1 mole) of 2-acetyl-5-trifluoromethylfuran in absolute alcohol is stirred during the dropwise addition of a solution of 15.3 g. of p-nitrophenylhydrazine in absolute ethyl alcohol. The stirred solution is heated to boiling and water is added until the solution just remains clear. After filtration the solution is chilled to give methyl 5-trifluoromethylfurylketone p-nitrophenylhydrazone.

EXAMPLE 15

Preparation of 5-trifluoromethyl-3-furfural p-nitrophenylhydrazone

A solution of 16.4 g. (0.1 mole) of 5-trifluoromethyl-3-furfural in absolute ethyl alcohol is stirred during the dropwise addition of a solution of 15.3 g. (0.1 mole) of p-nitrophenylhydrazine in absolute ethyl alcohol. The stirred solution is heated to boiling and water is added until the solution just remains clear. After filtration the solution is chilled to give 5 - trifluoromethyl-3-furfural p-nitrophenylhydrazone.

EXAMPLE 16

Preparation of 5-trifluoromethyl-2-furfural 2-benzothiazylhydrazone

A solution of 16.4 g. (0.1 mole) of 5-trifluoromethyl-2-furfural in absolute ethyl alcohol is stirred during the dropwise addition of a solution of 2-benzothiazylhydrazine in absolute ethyl alcohol. The stirred solution is heated to boiling and water is added until the solution just remains clear. After filtration the solution is chilled to give 5-trifluoromethyl-2-furfural 2 - benzothiazylhydrazone.

EXAMPLE 17

Preparation of 4-carbethoxy-5-trifluoromethyl-2-furfural-2-benzothiazylhydrazone A solution of 23.6 g. (0.1 mole) of 4-carbethoxy-5-trifluoromethyl-2-furfural in absolute ethyl alcohol is stirred during the dropwise addition of a solution of 15.1 g. (0.1 mole) of 2-benzothiazylhydrazine in absolute ethyl alcohol. The stirred solution is heated to boiling and water is added until the solution just remains clear. After filtration the solution is chilled to give 4-carbethoxy - 5-trifluoromethyl-2-furfural-2-benzothiazylhydrazone.

EXAMPLE 18

Preparation of phenyl 5-trifluoromethylfurylketone 2-acethylhydrazone

A solution of 24.0 g. (0.1 mole) of 2-benzoyl-5-trifluoromethylfuran in absolute ethyl alcohol is stirred during the dropwise addition of a solution of 7.4 g. (0.1 mole) of acethydrazide in absolute ethyl alcohol. The stirred solution is heated to boiling and water is added until the solution just remains clear. After filtration the solution is chilled to give phenyl 5-trifluoromethylfurylketone 2-acetylhydrazone.

EXAMPLE 19

Preparation of 5-trifluoromethyl-2-furfural 2-acetylhydrazone

A solution of 16.4 g. (0.1 mole) of 5-trifluoromethyl-2-furfural in absolute ethyl alcohol is stirred during the dropwise addition of a solution of 7.4 g. (0.1 mole) of acethydrazide in absolute ethyl alcohol. The stirred solution is heated to boiling and water is added until the solution just remains clear. After filtration the solution is chilled to give 5-trifluoromethyl-2-furfural 2-acetylhydrazone.

EXAMPLE 20

Preparation of 4-carbethoxy-5-trifluoromethyl-3-furfural 2-acetylhydrazone

A solution of 23.6 g. (0.1 mole) of 4-carbethoxy-5-trifluoromethyl-3-furfural in absolute ethyl alcohol is stirred during the dropwise addition of a solution of 7.4 g. (0.1 mole) of acethydrazide in absolute ethyl alcohol. The stirred solution is heated to boiling and water is added until the solution just remains clear. After filtration the solution is chilled to give 4-carbethoxy-5-trifluoromethyl-3-furfural 2-acetylhydrazone.

EXAMPLE 21

Preparation of 3-phenyl-5-trifluoromethyl-2-furfural p-nitrobenzoylhydrazone

A solution of 24.0 g. (0.1 mole) of 3-phenyl-5-trifluoromethyl-2-furfural in absolute ethyl alcohol is stirred during the dropwise addition of a solution of 18.1 g. (0.1 mole) of p-nitrobenzhydrazide in absolute ethyl alcohol. The stirred solution is heated to boiling and water is added until the solution just remains clear. After filtration the solution is chilled to give 3-phenyl-5-trifluoromethyl-2-furfural p-nitrobenzoylhydrazone.

EXAMPLE 22

Preparation of 5-trifluoromethyl-2-furfural p-nitrobenzoylhydrazone

A solution of 16.4 g. (0.1 mole) of 5-trifluoromethyl-2-furfural in absolute ethyl alcohol is stirred during the dropwise addition of a solution of 18.1 g. of p-nitrobenzhydrazide in absolute ethyl alcohol. The stirred solution is heated to boiling and water is added until the solution just remains clear. After filtration the solution is chilled to give 5-trifluoromethyl-2-furfural p-nitrobenzoylhydrazone.

EXAMPLE 23

Preparation of 4-carbethoxy-5-trifluoromethyl-2-furfural p-nitrobenzoylhydrazone A solution of 23.6 g. (0.1 mole) of 4-carbethoxy-5-trifluoromethyl-2-furfural in absolute ethyl alcohol is stirred during the dropwise addition of a solution of 18.1 g. (0.1 mole) of p-nitrobenzhydrazide in absolute ethyl alcohol. The stirred solution is heated to boiling and water is added until the solution just remains clear. After filtration the solution is chilled to give 4-carbethoxy-5-trifluoromethyl-2-furfural p-nitrobenzoylhydrazone.

EXAMPLE 24

Preparation of 5-trifluoromethyl-2-furfural 4,4-diphenylsemicarbazone

A solution of 16.4 g. (0.1 mole) of 5-trifluoromethyl-2-furfural in absolute ethyl alcohol is stirred during the dropwise addition of a solution of 22.7 g. (0.1 mole) of 4,4-diphenylsemicarbazide in absolute ethyl alcohol. The stirred solution is heated to boiling and water is added until the solution just remains clear. After filtration the solution is chilled to give 5-trifluoromethyl-2-furfural 4,4-diphenylsemicarbazone.

EXAMPLE 25

Preparation of 4-carbethoxy-5-trifluoromethyl-2-furfural 4,4-diphenylsemicarbazone A solution of 23.6 g. (0.1 mole) of 4-carbethoxy-5-trifluoromethyl-2-furfural in absolute ethyl alcohol is stirred during the dropwise addition of a solution of 22.7 g. (0.1 mole) of 4,4-diphenylsemicarbazide in absolute ethyl alcohol. The stirred solution is heated to boiling and water is added until the solution just remains clear. After filtration the solution is chilled to give 4-carbethoxy-5-trifluoromethyl-2-furfural 4,4-diphenylsemicarbazone.

EXAMPLE 26

Preparation of 5-trifluoromethyl-2-furfural guanylhydrazone

A solution of 16.4 g. (0.1 mole) of 5-trifluoromethyl-2-furfural in absolute ethyl alcohol is stirred during the dropwise addition of a solution of 7.4 g. of guanylhydrazine in absolute ethyl alcohol. The stirred solution is heated to boiling and water is added until the solution just remains clear. After filtration the solution is chilled to give 5-trifluoromethyl-2-furfural guanylhydrazone.

EXAMPLE 27

Preparation of 4-carbethoxy-5-trifluoromethyl-3-furfural guanylhydrazone

A solution of 23.6 g. (0.1 mole) of 4-carbethoxy-5-trifluoromethyl-3-furfural in absolute ethyl alcohol is stirred during the dropwise addition of a solution of 7.4 g. (0.1 mole) of guanylhydrazine in absolute ethyl alcohol. The stirred solution is heated to boiling and water is added until the solution just remains clear. After filtration the solution is chilled to give 4-carbethoxy-5-trifluoromethyl-3- furfural guanylhydrazone.

EXAMPLE 28

Preparation of N-(4-carbophenoxy-5-trifluoromethyl-2-furfuryl-ideneamino)morpholine A solution of 27.2 g. (0.1 mole) of 4-carbophenoxy-5-trifluoromethyl-2-furfural in absolute ethyl alcohol is stirred during the dropwise addition of a solution of 10.2 g. (0.1 mole) of N-aminomorpholine in absolute ethyl alcohol. The stirred solution is heated to boiling and water is added until the solution just remains clear. After filtration the solution is chilled to give N-(4-carbophenoxy-5-trifluoromethyl - 2 - furfurylideneamino)morpholine.

EXAMPLE 29

Preparation of N-(5-trifluoromethyl-2-furfuryl-ideneamino)-morpholine

A solution of 16.4 g. (0.1 mole) of 5-trifluoromethyl-2-furfural in absolute ethyl alcohol is stirred during the dropwise addition of a solution of 10.2 g. (0.1 mole) of N-aminomorpholine in absolute ethyl alcohol. The stirred solution is heated to boiling and water is added until the solution just remains clear. After filtration the solution is chilled to give N-(5-trifluoromethyl-2-furfurylideneamino)morpholine.

EXAMPLE 30

Preparation of N-(4-carbethoxy-5-trifluoromethyl-3-furfuryl-ideneamino)morpholine A solution of 23.6 g. (0.1 mole) of 4-carbethoxy-5-trifluoromethyl-3-furfural in absolute ethyl alcohol is stirred during the dropwise addition of a solution of 10.2 g. (0.1 mole) of N-aminomorpholine in absolute ethyl alcohol. The stirred solution is heated to boiling and water is added until the solution just remains clear. After filtration the solution is chilled to give N-(4-carbethoxy-5-trifluoromethyl-3-furfurylideneamino)morpholine.

EXAMPLE 31

Preparation of N-(5-trifluoromethyl-3-furfurylidene-amino)piperidine

A solution of 16.4 g. (0.1 mole) of 5-trifluoromethyl-3-furfural in absolute ethyl alcohol is stirred during the dropwise addition of a solution of 10.0 g. (0.1 mole) of N-amino piperidine in absolute ethyl alcohol. The stirred solution is heated to boiling and water is added until the solution just remains clear. After filtration the solution is chilled to give N-(5 - trifluoromethyl - 3-furfurylideneamino)piperidine.

EXAMPLE 32

Preparation of N-(4-carbethoxy-5-trifluoromethyl-2-furfuryl-ideneamino)piperidine A solution of 23.6 g. (0.1 mole) of 4-carbethoxy-5-trifluoromethyl-2-furfural in absolute ethyl alcohol is stirred during the dropwise addition of a solution of 10.0 g. (0.1 mole) of N-aminopiperidine in absolute ethyl alcohol. The stirred solution is heated to boiling and water is added until the solution just remains clear. After filtration the solution is chilled to give N-(4-carbethoxy-5-trifluoromethyl-2-furfurylideneamino)piperidine.

EXAMPLE 33

Preparation of 4-carbophenoxy-5-trifluoromethyl-2-furfuryl 2-hydroxyethylhydrazone A solution of 27.2 g. (0.1 mole) of 4-carbophenoxy-5-trifluoromethyl-2-furfural in absolute ethyl alcohol is stirred during the dropwise addition of a solution of 7.6 g. (0.1 mole) of 2-hydroxyethylhydrazine in absolute ethyl alcohol. The stirred solution is heated to boiling and water is added until the solution just remains clear. After filtration the solution is chilled to give 4-carbophenoxy - 5-trifluoromethyl - 2-furfural 2-hydroxyethylhydrazone.

EXAMPLE 34

Preparation of 5-trifluoromethyl-3-furfural 2-hydroxyethyl-hydrazone

A solution of 16.4 g. (0.1 mole) of 5-trifluoromethyl-3-furfural in absolute ethyl alcohol is stirred during the dropwise addition of a solution of 7.6 g. (0.1 mole) of 2-hydroxyethylhydrazine in absolute ethyl alcohol. The stirred solution is heated to boiling and water is added until the solution just remains clear. After filtration the solution is chilled to give 5-trifluoromethyl-3-furfural 2-hydroxyethylhydrazone.

EXAMPLE 35

Preparation of phenyl 5-trifluoromethylfurylketone 2-hydroxy-ethylhydrazone

A solution of 24.0 g. (0.1 mole) of 2-benzoyl-5-trifluoromethylfuran in absolute ethyl alcohol is stirred during the dropwise addition of a solution of 7.6 g. (0.1 mole) of 2-hydroxyethylhydrazine in absolute ethyl alcohol. The stirred solution is heated to boiling and water is added until the solution just remains clear. After filtration the solution is chilled to give phenyl 5-trifluoromethylfurylketone 2-hydroxyethylhydrazone.

EXAMPLE 36

Preparation of N-(4-carbethoxy-5-trifluoromethyl-2-2-furfurylideneamino)-2-oxazolidinone A solution of 23.6 g. (0.1 mole) of 4-carbethoxy-5-trifluoromethyl-2-furfural in absolute ethyl alcohol is stirred during the dropwise addition of a solution of 10.2 g. (0.1 mole) of 3-amino-2-oxazolidinone in absolute ethyl alcohol. The stirred solution is heated to boiling and water is added until the solution just remains clear. After filtration the solution is chilled to give N-(4-carbethoxy - 5-trifluoromethyl - 2-furfurylideneamino) - 2-oxazolidinone.

EXAMPLE 37

This example shows the preparation of intermediates of the Formulae V–VIII compounds.

(A) Preparation of 3-carbethoxy-1,1,1-trifluorohexane-2,5-dione (compound of Formula VIII)

To a stirred mixture of 8.6 g. (0.2 mole) of a 56% oil dispersion of sodium hydride and 100 ml. of anhydrous 1,2-dimethoxyethane was added, under anhydrous conditions, 36.8 g. (0.2 mole) of ethyl trifluoroacetoacetate over a 15 minute period. The mixture spontaneously heated up to the reflux temperature during the addition. The mixture was heated to maintain a gentle reflux until a clear solution was obtained and hydrogen evolution had ceased. Next 0.1 g. NaI was added and the solution was stirred an additional 5 minutes. Then 19.5 g. (0.21 mole) of chloroacetone was added over a 15 minute period. The mixture was refluxed and stirred for 5 hours after which it was filtered to remove the sodium chloride. The salt cake was washed with ether and the filtrate and washings were combined and evaporated. The rsidual oil was distilled using a 6 inch Vigreaux column at 0.9 mm. pressure. The material boiling between 70 and 73° C., $n_D^{25}$ 1.4010 was collected giving 17.1 g. (35% yield) of 3-carbethoxy-1,1,1-trifluorohexane-2,5-dione. This material gave a positive ferric chloride test and showed one major peak on V.P.C. analysis.

Analysis.—Calcd. for $C_9H_{11}F_3O_4$ (percent): C, 45.1; H, 4.62; F, 23.7. Found (percent): C, 45.2; H, 4.74; F, 23.8.

(B) Preparation of ethyl 5-methyl-2-trifluoromethyl-3-furoate (a compound of Formula VII)

In a flask equipped with a Dean-Stark water separator was placed 75 ml. of toluene and 0.5 g. p-toluene-sulfonic acid monohydrate. The mixture was refluxed until the water had been removed from the acid. Then, 7.0 g. of 3-carbethoxy-1,1,1-trifluorohexane-2,5-dione was added and the mixture was refluxed for 17 hours. During this time 0.5 ml. of water was collected (theo. 0.5 ml.). The solution was then washed with water, dried over sodium sulfate and evaporated under reduced pressure. The residual oil was distilled at 0.05 mm. and the ethyl 5-methyl-2-trifluoromethyl-3-furoate, which boiled at 40°, was collected, $n_D^{25}$ 1.4184, wt. 3.1 g. (49% yield).

Analysis.—Calcd. for $C_9H_9O_3F_3$ (percent): C, 48.6; H, 4.08; F, 25.7. Found (percent). C, 48.5; H, 4.14; F, 25.9.

(C) Preparation of ethyl 5-bromomethyl-2-trifluoromethyl-3-furoate and ethyl 5-(dibromomethyl)-2-trifluoromethyl-3-furoate (compounds of Formula VI)

A mixture of 174.4 g. of N-bromosuccinimide, 200 g. ethyl 5-methyl-2-trifluoromethyl-3-furoate and 600 ml. of carbon tetrachloride was heated under reflux for 2 hours and 15 minutes. During this time a 275 watt sun lamp was shone on the mixture. The mixture was cooled and washed twice with 150-ml. portions of aqueous 5% sodium bicarbonate and then dried with magnesium sulfate. The carbon tetrachloride was removed by evaporation and the residual oil distilled at low pressure to give two main fractions. The first, B.P. 70–75° C. at .1 mm. was shown to be pure ethyl 5-bromomethyl-2-trifluoromethyl-3-furoate by Infrared and G.L.C. analysis.

Analysis.—Calcd. for $C_9H_8F_3BrO_3$ (percent): C, 35.9; H, 2.72; F, 18.9; Br, 26.5. Found (percent): C, 36.0; H, 2.60; F, 18.8; Br, 26.4.

The higher boiling fraction, B.P. 82–84° C. at .03 mm. was found to be ethyl 5-(dibromomethyl)-2-trifluoromethyl-3-furoate.

Analysis.—Calcd. for $C_9H_7Br_2F_3O_2$ (percent): C, 28.45; H, 1.86; Br, 42.06; F, 15.00. Found (percent): C, 28.55; H, 1.99; Br, 42.10; F, 15.00.

(D) Preparation of ethyl 2-formyl-5-trifluoromethyl-4-furoate (a Formula V compound)

To 1.55 g. of sodium dissolved in 65 ml. of absolute ethanol was added 87.55 g. of 2-nitropropane. Next was added 20 g. of ethyl 5-bromomethyl-2-trifluoromethyl-3-furoate and the mixture was stirred at room temperature for 20 hours. The ethanol was removed by evaporation at reduced pressure and water was added to the residue. The resulting mixture was extracted with ether. The ether phase was washed with 10% sodium carbonate and then water. The ether phase was dried over magnesium sulfate and then evaporated. The residual oil was distilled under reduced pressure (0.4 mm.) to give 11 g. of ethyl 2-formyl-5-trifluoromethyl-4-furoate boiling at 75–85°.

(E) Decarboxylation of ester compound of Formula V to prepare another furan compound of Formula V (1) Preparation of 5-methyl-2-trifluoromethyl-3-furoic acid.—To 1.0 g. (0.0045 mole) of ethyl 5-methyl-2-trifluoromethyl-3-furoate was added 10 ml. of ethanol, 2 ml. of water and 0.2 g. of sodium hydroxide and the solution was refluxed for 45 minutes. The mixture was poured into 100 ml. of water and acidified with hydrochloric acid to a pH of about 3. The solid, 5-methyl-2-trifluoromethyl-3-furoic acid, was collected by filtration, wt. 0.63 g. (58% yield), M.P. 122–125° C. The material was recrystallized from cyclohexane and dried under vacuum to give an analytical sample, M.P. 123–125° C.

Analysis.—Calcd. for $C_7H_5O_3F_3$ (percent): C, 43.4; H, 2.59; F, 29.4. Found (percent): C, 43.6; H, 2.57; F, 29.4.

(2) Preparation of 2-methyl-5-trifluoromethylfuran.— A distillation assembly using a 4-inch column packed with glass helices and an efficient condensing system was used in the decarboxylation of the acid. In the still pot of the distillation assembly was placed 20 ml. of quinoline and 2 g. of copper sulfate. To the mixture was added 10 g. of 5-methyl-2-trifluoromethyl-3-furoic acid. The mixture was heated rapidly to 210–220° C. while nitrogen was bubbled gently through the mixture to sweep out the decarboxylated material. When the evolution of decarboxylated material had ceased (about 10 minutes) the still pot was cooled and the process was repeated. When all the material had been decarboxylated the product in the receiver was taken up in ether and the mixture was dried over magnesium sulfate. The solution was then filtered and distilled. First a short Vigreaux column was employed to remove the ether and then a column packed with glass helices was used in distilling the product. From 120 g. of starting acid 65.9 g. (71.5% yield) of 2-methyl-5-trifluoromethylfuran, boiling at 81–82° C., $n_D^{25}$ 1.3685 was obtained. A gas-liquid chromatography analysis of the material indicated a high degree of purity.

*Analysis.*—Calcd. for $C_6H_5OF_3$ (percent): C, 48.0; H, 3.36; F, 3.80. Found (percent): C, 48.2; H, 3.36; F, 3.79.

What is claimed is:

1. A compound of the formula

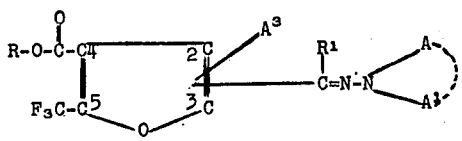

wherein: R is a member selected from the group consisting of (lower) alkyl, cycloalkyl having from 3 to 6 carbon atoms, phenyl, naphthyl, benzyl, phenethyl, α-naphthylmethyl and β-naphthylmethyl; $A^3$ is a member of the group selected from hydrogen, phenyl and naphthyl; $R^1$ is hydrogen; each of A and $A^1$ is hydrogen, (lower) alkyl, (lower) hydroxyalkyl, cycloalkyl of 3 to 6 carbon atoms, phenyl, (lower) phenylalkyl, halo-substituted phenyl, nitro-substituted phenyl, 3-(2-oxazolidinone), piperidino, 4-(lower) alkyl piperazino, 2-benzothiazolyl, 2-quinolinyl, 3-quinolinyl, pyrrolidino, morpholino, thio-morpholino, 2-(1,2,3,4-tetrahydroisoquinolyl), 1-(1,3,4-triazolyl), 3-(1,3,4-oxadiazolyl), 3-(2-thiooxazolidonyl) or symmetrical triazinyl, or A and $A^1$ taken together with the nitrogen to which they are attached is 3-(2-oxazolidinone), piperidino, 4-(lower) alkyl piperazino, 2-benzothiazolyl, 2-quinolinyl, 3-quinolinyl, pyrrolidino, morpholino, thio-morpholino, 2-(1,2,3,4-tetrahydroisoquinolyl), 1-(1,3,4-triazolyl), 3-(1,3,4-oxadiazolyl), 3-(2-thiooxazolidonyl) or symmetrical triazinyl; and wherein one of $A^3$ and the

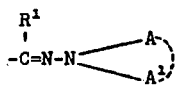

group is attached to the 2-carbon atom of the furan ring and the other is attached to the 3-carbon atom of said ring.

2. A compound of claim 1 wherein: R is (lower) alkyl; $R^1$ is hydrogen; and $A^3$ is hydrogen attached to the 3-position of the furan ring.

3. A compound of claim 2 wherein each of A and $A^1$ is (lower) alkyl.

4. A compound of claim 2 wherein: R is ethyl; and A and $A^1$ together with the nitrogen to which they are attached is 3-(2-oxazolidinone).

5. A compound of claim 1 where R is (lower) alkyl; $A^3$ is hydrogen on the 3-position of the furan ring; $A^1$ is hydrogen and A is a group of the formula

wherein X is a member selected from the group consisting of oxygen, sulphur, imino, (lower) alkylimino and phenylimino; and D is (lower) alkyl.

6. A compound of claim 1 wherein R is ethyl; $A^3$ is hydrogen on the 3-position of the furan ring; $A^1$ is hydrogen and A is carbamyl.

7. A compound of claim 1 wherein R is ethyl; $A^3$ is hydrogen on the 3-position of the furan ring; $A^1$ is hydrogen and A is thiocarbamyl.

8. A compound of the formula

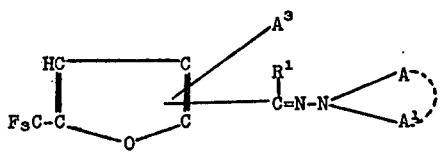

wherein: $A^3$ is a member selected from the group consisting of hydrogen, phenyl, and naphthyl; $R^1$ is hydrogen; each of A and $A^1$ is hydrogen, (lower) alkyl, (lower) hydroxyalkyl, cycloalkyl of 3 to 6 carbon atoms, phenyl, (lower) phenylalkyl, halo-substituted phenyl, nitro-substituted phenyl, 3-(2-oxazolidinone), piperidino, 4-(lower) alkyl piperazino, 2-benzothiazolyl, 2-quinolinyl, 3-quinolinyl, pyrrolidino, morpholino, thio-morpholino, 2-(1,2,3,4-tetrahydroisoquinolyl), 1-(1,3,4-triazolyl), 3-(1,-3,4-oxadiazolyl), 3-(2-thiooxazolidonyl) or symmetrical triazinyl, or A and $A^1$ taken together with the nitrogen to which they are attached is 3-(2-oxazolidinone), piperidino, 4-(lower) alkyl piperazino, 2-benzothiazolyl, 2-quinolinyl, 3-quinolinyl, pyrrolidino, morpholino, thio-morpholino, 2-(1,2,3,4-tetrahydroisoquinolyl), 1-(1,3,4-triazolyl), 3-(1,3,4-oxadiazolyl), 3-(2-thiooxazolidonyl or symmetrical triazinyl; and wherein one of $A^3$ and the

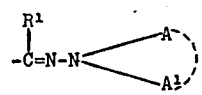

group is attached to the 2-carbon atom of the furan ring and the other is attached to the 3-carbon atom of said ring.

9. A compound of claim 8 wherein $R^1$ is hydrogen; and $A^3$ is hydrogen attached to the 3-position of the furan ring.

10. A compound of claim 8 wherein A and $A^1$ together with the nitrogen to which they are attached is 3-(2-oxazolidinone).

11. A compound of the formula

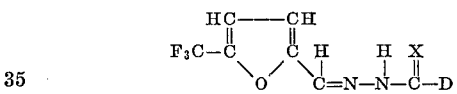

wherein X is a member selected from the group consisting of oxygen, sulfur, imino, (lower) alkylimino, and phenylimino, and D is primary amino, (lower) alkylamino, (lower) dialkylamino, diphenylamino, (lower) phenylalkylamino, (lower) diphenylalkylamino, (lower) alkyl, phenyl nitro-substituted phenyl and (lower) phenyl alkyl.

12. A compound of claim 11 wherein D is (lower) alkyl.

13. A compound of claim 11 wherein A is carbamyl.

14. A compound of claim 11 wherein A is thiocarbamyl.

15. A compound of the formula

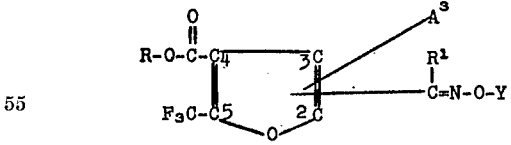

wherein: R is a member selected from the group consisting of (lower) alkyl, cycloalkyl having from 3 to 6 carbon atoms, phenyl, naphthyl, benzyl, phenethyl, α-naphthylmethyl and β-naphthylmethyl; $A^3$ is a member of the group selected from hydrogen, phenyl and naphthyl; $R^1$ is hydrogen; Y is a member selected from the group consisting of hydrogen and O-sulfonic acid; and one of $A^3$ and the

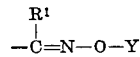

group is in the 2-position of the furan ring whereas the other is in the 3-position of the furan ring.

16. A compound of claim 15 wherein R is (lower) alkyl and each of $A^3$, $R^1$ and Y is hydrogen.

17. A compound of claim 16 wherein R is ethyl and $A^3$ is in the 3-position of the furan ring.

18. A compound of the formula

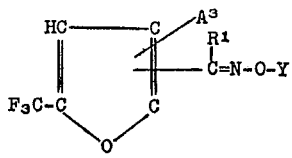

wherein $A^3$ is hydrogen, $R^1$ is hydrogen, Y is hydrogen and one of $A^3$ and the

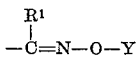

group is in the 2-position of the furan ring whereas the other is in the 3-position of the furan ring.

19. A compound of claim 18 wherein $A^3$ is in the 3-position of the furan ring.

20. A compound of the formula

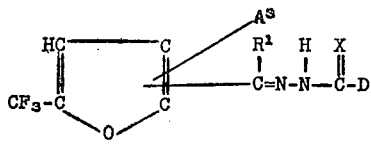

wherein: $A^3$ is hydrogen, phenyl or naphthyl; $R^1$ is hydrogen; X is oxygen, sulfur, imino, (lower) alkylimino or phenylimino; and D is primary amino, (lower) alkylamino, (lower) dialkylamino, diphenylamino, (lower) phenylalkylamino, (lower) diphenylalkylamino, (lower) alkyl, phenyl, nitro-substituted phenyl or (lower) phenylalkyl; and wherein one of $A^3$ and the

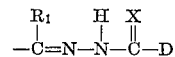

group is attached to the 2-carbon atom of the furan ring and the other is attached to the 3-carbon atom of said ring.

References Cited

Sherman et al., J. Org. Chem., vol. 25, pp. 2048 to 2049 (1960).

Yale et al., J. Med. Pharm., Chem., vol. 1, pp. 131 to 132 added (1959).

Yale, J. Med. & Pharm. Chem., vol. 1, p. 121 (1959).

Beilstein's Handbuch der Organischen Chemie, 4th ed., vol. 18, p. 326 (system No. 2619) (1952).

Chemical Abstracts I, vol. 48, col. 2029 (1954) (abstract of Roncero et al.).

Chemical Abstracts II, vol. 54, col. 7750 (a) (1960) (abstract of Zwicky et al.).

Dunlap et al., The Furans, pp. 403 to 404 (1953).

JOHN D. RANDOLPH, Primary Examiner

U.S. Cl. X.R.

99—2, 4; 260—243, 247.5, 249.5, 288, 293, 296, 302, 304, 306.8, 307, 309.5, 326.5, 347.2, 347.3, 347.7, 999